US008713405B2

(12) United States Patent
Healey, Jr. et al.

(10) Patent No.: US 8,713,405 B2
(45) Date of Patent: Apr. 29, 2014

(54) METHOD AND APPARATUS FOR ALLOCATING ERASURE CODED DATA TO DISK STORAGE

(75) Inventors: Michael W. Healey, Jr., North Grosvenordale, CT (US); David Cordella, Shrewsbury, MA (US); Arthur J. Beaverson, Boxborough, MA (US); Steven Bagby, Lexington, MA (US)

(73) Assignee: SimpliVity Corporation, Westborough, MA (US)

(*) Notice: Subject to any disclaimer, the term of this patent is extended or adjusted under 35 U.S.C. 154(b) by 380 days.

(21) Appl. No.: 13/302,510

(22) Filed: Nov. 22, 2011

(65) Prior Publication Data

US 2013/0132800 A1 May 23, 2013

(51) Int. Cl.
*G11C 29/00* (2006.01)
*G06F 13/00* (2006.01)

(52) U.S. Cl.
USPC .................. 714/763; 714/770; 711/173

(58) Field of Classification Search
USPC .............. 714/763, 769, 770; 711/170, 173
See application file for complete search history.

(56) References Cited

U.S. PATENT DOCUMENTS 6,212,657 B1 * 4/2001 Wang et al. .................. 714/746
7,853,822 B2 * 12/2010 Molaro et al. ............... 714/6.12
8,099,576 B1 * 1/2012 Edwards et al. ............. 711/170
8,456,972 B2 * 6/2013 Mehra et al. ................ 369/47.27
2006/0085594 A1 4/2006 Roberson et al.

OTHER PUBLICATIONS

IBM TDB vol. 37 No. 06B Jun. 1994 by Howe and Reznak "Bit Map Storage Validation Machine".*
Leung, C.H.C., "Analysis of Secondary Storage Fragmentation," Software Engineering, IEEE Transactions on, vol. SE-9, No. 1, pp. 87,93, Jan. 1983.*
Zhu, Y.; Yang Yu; Wang, W.Y.; Tan, S.S.; Tee Chong Low, "A Balanced Allocation Strategy for File Assignment in Parallel I/O Systems," Networking, Architecture and Storage (NAS), 2010 IEEE Fifth International Conference on, vol., No., pp. 257,266, Jul. 15-17, 2010.*
The Written Opinion and International Search Report mailed Feb. 12, 2013 in corresponding PCT/US2012/066297.
Jianqiang Luo et al., An Efficient XOR-Scheduling Algorithm for Erasure Codes Encoding, DSN-2009: The 39$^{th}$ Annual IEEE/IFIP International Conference on Dependable Systems and Networks, Lisbon, Portugal, Jun. 2009.

(Continued)

*Primary Examiner* — Cynthia Britt
(74) *Attorney, Agent, or Firm* — Therese A. Hendricks

(57) ABSTRACT

Allocation process that allows erasure coded data to be stored on any of a plurality of disk drives, in a pool of drives, so that the allocation is not tied to a fixed group of drives. Still further, the encoded data can be generated by any of multiple different erasure coding algorithms, where again storage of the encoded data is not restricted to a single group of drives based on the erasure algorithm being utilized to encode the data. In another embodiment, the encoded data can be "stacked" (aligned) on select drives to reduce the number of head seeks required to access the data. As a result of these improvements, the system can dynamically determine which one of multiple erasure coding algorithms to utilize for a given incoming data block, without being tied to one particular algorithm and one particular group of storage devices as in the prior art.

24 Claims, 15 Drawing Sheets

(56) References Cited

OTHER PUBLICATIONS

James S. Plank, A Performance Evaluation and Examination of Open-Source Erasure Coding Libraries for Storage, FAST-2009: 7$^{th}$ USENIX Conference on File and Storage Technologies, San Francisco, CA, Feb. 2009.

James S. Plank, Erasure Codes for Storage Applications, Tutorial given at FAST-2005: 4$^{th}$ Usenix Conference on File and Storage Technologies, San Francisco, CA Dec. 2005.

James S. Plank and Lihao Xu, Optimizing Cauchy Reed-Solomon Codes for Fault-Tolerant Network Storage Applications, the 5$^{th}$ IEEE International Symposium on Network Computing and Applications (IEEE NCA06), Cambridge, MA Jul. 2006.

\* cited by examiner

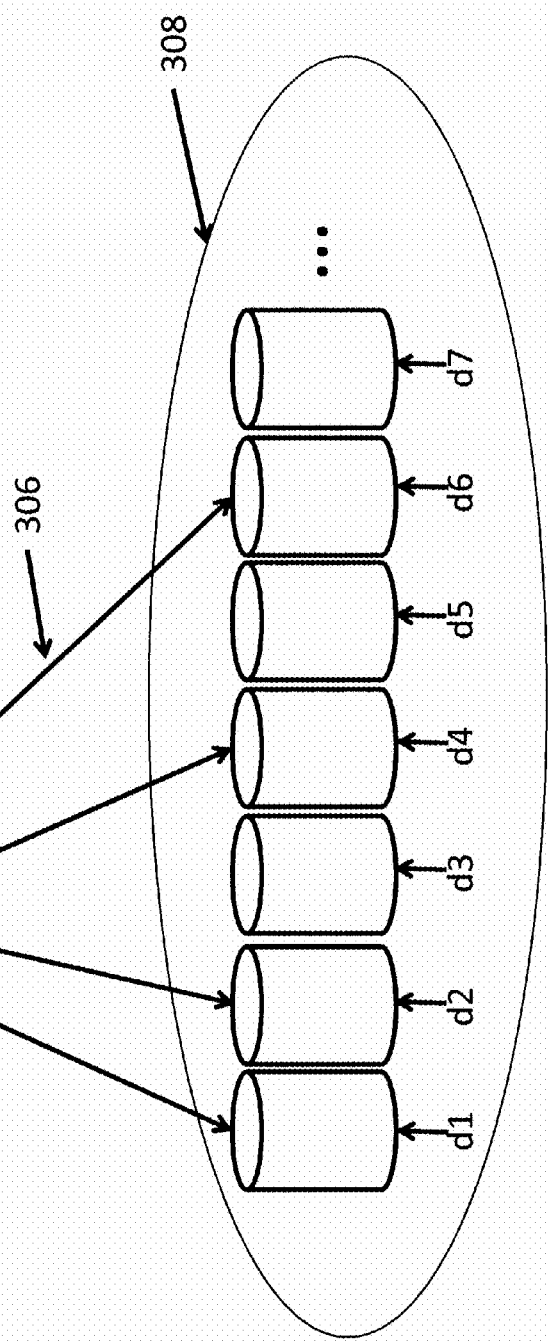

Example B:
EC Category
4 of 6: 67%

Object of size x = 16 gets broken into 16 elements of size x/16, is coded into 24 chunks of size x/16, and is written out as 6 chunk groups of size x/4.

METHOD AND APPARATUS FOR ALLOCATING ERASURE CODED DATA TO DISK STORAGE

FIELD OF THE INVENTION

The present invention relates to computer storage systems and to methods and apparatus for placement of data on disk storage which allows for the use of multiple erasure coding algorithms.

BACKGROUND

A significant job of a file system, operating system or other storage manager is to place data on a storage medium, such as a disk storage device. Where the data is written (placed on the disk) and when and how it is accessed, can have a significant effect on the read/write performance.

Another significant job is protecting the data from loss in the event of physical damage to the storage medium (fault tolerance). RAID, an acronym for Redundant Array of Independent Disks, is an umbrella term for various data storage schemes that divide and replicate data among multiple physical drives, so that if one (or possibly more) drive(s) is damaged, the data on those lost drives can be recovered. Each scheme provides a different balance between the two primary goals: increased data reliability and increased input/output (I/O) performance.

Erasure coding is a collection of error correction algorithms that enable recovery of data lost on a failed drive in a storage system based on multiple disk drives (e.g., of a RAID array). The general process for generating and writing erasure coded data to storage comprises:
1. data arrives in a series of blocks;
2. each block is broken into sub-blocks;
3. the erasure coding algorithm is applied to the group of sub-blocks;
4. the result is a larger number of sub-blocks as determined by the specific algorithm used (e.g., to include parity data);
5. the resulting sub-blocks are written out in groups of one or more sub-blocks as determined by the specific algorithm used, to the storage media, one group per device (e.g., disk drive).

The recovery process (i.e., recovery of the data that has been lost on a failed disk drive) then proceeds as follows:
1. read the remaining groups of sub-blocks from the other (non-failed) devices;
2. apply the recovery algorithm to the remaining sub-blocks to generate the lost data;
3. return the original complete data block.

The above process descriptions are generic and apply to many different erasure coding algorithms. Each coding algorithms has its own set of trade-offs regarding:
1. I/O performance;
2. CPU utilization;
3. storage efficiency;
4. number of drive failures tolerated.

According to current industry standards, the data size, the erasure coding algorithm, and the array of disk drives are tied together as one integral whole, such that once a drive grouping configuration is established for the data and algorithm, the erasure coding algorithm cannot be changed. In designing such a system, a choice is made based on the redundancy required, the amount of data being stored, and the granularity of the data blocks. Based on these parameters, and balancing performance characteristics such as access time and recovery time, a configuration array (fixed group of physical disk drives) is selected. Once this drive grouping is established, only the designated erasure coding algorithm can be used to store data on those drives. Still further, writing data in a size smaller than the minimum specified by the selected erasure coding algorithm causes a performance hit (drop) because it requires a more time consuming read-modify-write, rather than simply a write.

Thus, there is a need for a more flexible system for allocating erasure coded data to disk storage. Increased flexibility would be desirable to enhance one or more of I/O performance, CPU utilization, storage capacity, fault tolerance, and/or recovery time.

SUMMARY OF THE INVENTION

In accordance with one embodiment of the invention, an allocation process is provided that allows erasure coded data to be stored on any of a plurality of disk drives, in a pool of drives, so that the allocation is not tied to a fixed group of drives. Still further, the encoded data can be generated by any one of multiple different erasure coding algorithms, where again storage of the encoded data is not restricted to a single group of drives based on the erasure algorithm being utilized to encode the data. In yet another embodiment, the encoded data can be "stacked" (aligned) on select drives to reduce the number of head seeks required to access the data. As a result of these improvements, the system can dynamically determine which one of multiple erasure coding algorithms to utilize for a given incoming data block, without being tied to one particular algorithm and one particular group of storage devices as in the prior art.

In accordance with one embodiment of the invention, a computer-implemented method is provided for locating data on storage comprising computer-executable acts of:
 allocating for storage on the same or different devices in a pool of disk storage devices, a plurality of encoded data objects encoded by the same or different erasure codes;
 for each encoded object to be stored on multiple logical storage units, utilizing an allocation bitmask as a single request for available allocation units to store the respective encoded object on the multiple logical storage units, wherein the allocation bitmask spans the multiple logical storage units and includes a gap aligned with a starting partition boundary for the encoded object being stored.

In one embodiment, the allocating step includes allocating the encoded objects on different devices.

In one embodiment, the allocating step includes allocating encoded objects encoded by different erasure codes.

In one embodiment, the allocating step includes allocating multiple encoded objects on the same local storage unit.

In one embodiment, the allocating step includes allocating multiple encoded objects on the same logical storage unit group.

In one embodiment, the method includes using the allocation bitmask to request allocation units aligned with a logical storage unit boundary.

In one embodiment, the object size of the data being encoded is fixed.

In one embodiment, the object size of the data being encoded is variable.

In one embodiment, the data objects are encoded by different categories of erasure codes.

In one embodiment, the method includes providing an index of the encoded data objects which maps each encoded data object to its respective erasure code.

In one embodiment, the allocating step includes using an allocation bitmap marking the available allocation units.

In one embodiment, the allocation bitmap maps to a logical address space.

In one embodiment, a logical object number (LON) defines a pointer to the encoded object.

In one embodiment, a pointer to the encoded object is stored in an index record.

In one embodiment, the index record includes multiple pointers to the encoded object.

In one embodiment, the allocating step uses a boundary bitmap marking the allocation unit for an initial chunk of the encoded object.

In accordance with another embodiment of the invention, a computer-readable medium is provided having stored thereon instructions which perform, when loaded into a computer, the method steps described above.

In accordance with another embodiment of the invention, a programmable logic is provided configured to implement the method steps described above.

In accordance with another embodiment of the invention, a data storage system is provided comprising:

an erasure coding algorithm selection component operable to select, for different incoming data objects, different erasure coding algorithms for generating encoded data objects; and a disk storage allocation component for allocating the encoded data objects encoded by the different algorithms to any available allocation units on the same or different devices in a pool of disk storage devices.

In one embodiment, the system includes a pool of disk storage devices for storing the encoded data.

In one embodiment, the disk storage allocation component utilizes an allocation bitmask to request, for each encoded data object, available storage units for storing the encoded object across one or multiple logical storage units of a logical storage unit group that spans multiple devices in the pool, and wherein the bitmask includes a gap allowing the encoded object to be stored on multiple logical storage units on at least one device in the pool.

In one embodiment, the system includes an index of the encoded data objects to its respective erasure coding algorithm.

In accordance with another embodiment of the invention, in a computing environment for locating data storage, a data structure is provided comprising an allocation bitmask to request available allocation units for storing encoded objects across one or multiple logical storage units, the encoded data objects being encoded in different erasure codes, the allocation bitmask spanning multiple logical storage units across a plurality of disk drives, and the bitmask including a gap aligned with a starting partition boundary for the encoded object being stored where the available allocation units are requested across multiple logical storage units.

BRIEF DESCRIPTION OF THE DRAWINGS

FIGS. 3A-3B illustrate one example of encoding a data object with a 2 of 4 coding algorithm;

DETAILED DESCRIPTION

Figure 1:
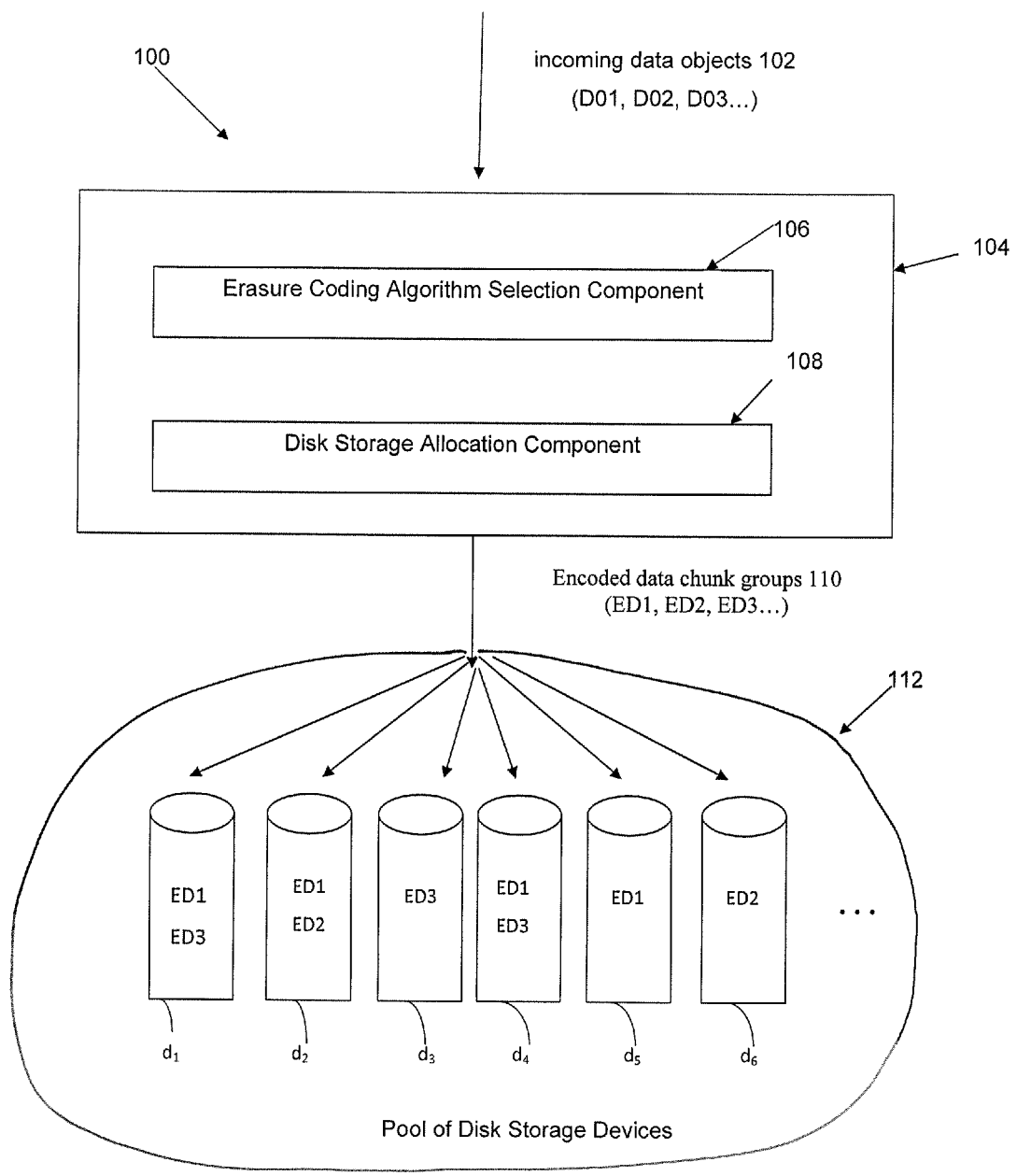
FIG. 1 is a schematic high level system architecture for one embodiment of the invention, illustrating the encoding of the incoming data objects with different erasure coding algorithms and subsequent allocation of encoded data to storage in a pool of disk storage devices.

Various embodiments of the present invention are now described with reference to the drawings. In the following description, for purposes of explanation, numerous specific details are set forth in order to provide a thorough understanding of one or more implementations of the present invention. It will be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The present invention may also be illustrated as a flow chart of a process of the invention. While, for the purposes of simplicity of explanation, the one or more methodologies shown in the form of a flow chart are described as a series of acts, it is to be understood and appreciated that the present invention is not limited by the order of acts, as some acts may, in accordance with the present invention, occur in a different order and/or concurrent with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

In various embodiments of the invention disclosed herein, the terms "data", "data element" or "data object" are used interchangeably. As used herein, data means an opaque collection of data, e.g., any sequence of symbols (typically denoted "0" and "1") that can be input into a computer, stored and processed there, or transmitted to another computer. As used herein, data includes metadata, a description of other data. Data written to a storage system as described herein may be data objects of the same size, or data objects of variable sizes.

A "storage system" as used herein may be any system or application for storing data to disk storage, for example a file system, a block storage device, or other system. A storage system may use an identifier or name to reference each data element in storage. In one example, the name is a globally unique identifier (GUID), such as a hash of the data content, preferably a cryptographic hash or collision resistant hash of the data content. Other naming conventions are possible, as long as each data element has a name within the storage system that permits reconstituting the data stored to the user. In one embodiment a central server generates the names. Data names are usually fixed length binary strings intended for use by programs, as opposed to humans. An index (sometimes as referred to as a dictionary or catalog) of all the data may be needed by the storage system in order to access (locate) each data element. Each record in the index may contain the name of a data element, its logical and/or physical location (address), and other information concerning the respective data element. In one embodiment, each index entry includes a pointer that points to a physical block address on a disk where the data object is stored. In one embodiment a fixed algorithm may be used to locate the physical location on a disk where the data is stored.

A. System Architecture

FIG. 1 illustrates a high level system architecture 100 for one embodiment of the invention. Incoming data objects 102 are received by a storage system 104 for placement on disk storage devices d1, d2, d3, d4, d5, d6 ... of disk storage pool 112. The system 104 includes an erasure coding algorithm selection component 106 and a disk storage allocation component 108. For each incoming data object (DO1, DO2, DO3 ... ) the component 106 selects one of multiple erasure coding algorithms ($ECA_1$, $ECA_2$, $ECA_3$ ... ) to encode the selected data object into encoded data chunk groups 110 (ED1, ED2, ED3 ... ). The component 108 then allocates these chunk groups to a plurality of disk storage devices in the pool 112 of such devices, one chunk group per device, wherein the allocation of chunk groups to devices can be made independently for each data object, and the allocation is not limited to a contiguous or fixed set of devices in the device pool 112. For example, FIG. 1 shows the multiple chunk groups ED1 for data object DO1 have been allocated to disks d1, d2, d4, d5 ... ; the multiple chunk groups ED2 for data object DO2 have been allocated to devices d2, d6 ... ; and the multiple chunk groups ED3 for DO3 have been allocated to devices d1, d3, d4 .... Thus, for the three different encoding algorithms the resulting encoded data can be stored on the same or different sub-groups of disks in the disk pool 112.

Figure 2:
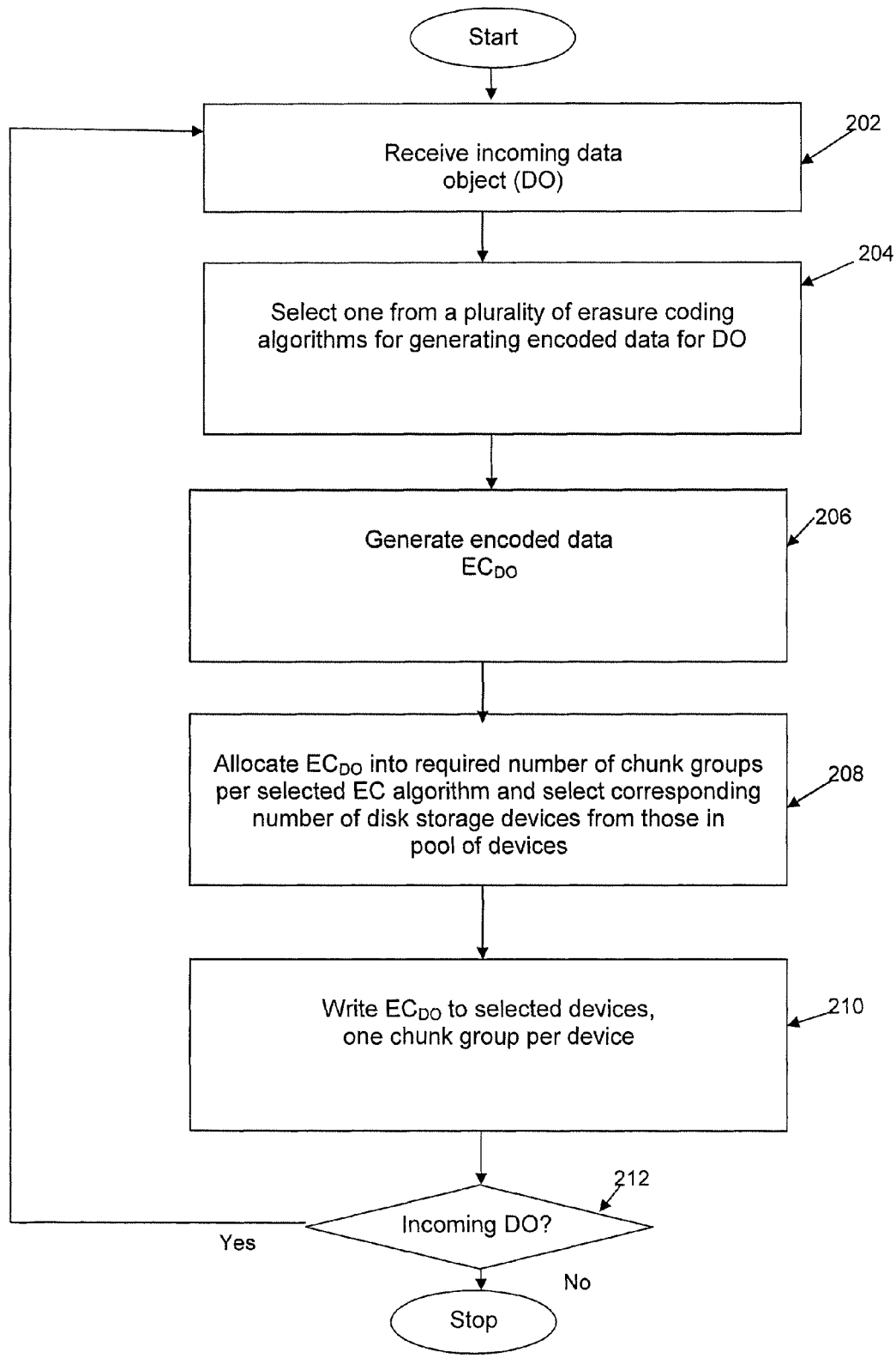
FIG. 2 is a flow chart of a process according to one embodiment of the invention for selecting an erasure coding algorithm and allocating the encoded data to disk storage in the pool of disk storage devices.

FIG. 2 is a flow chart of a process illustrating one embodiment of the invention for selecting an erasure coding algorithm and allocating the encoded data to disk storage in a pool of disk storage devices. At 202, the process starts by receiving an incoming data object (DO). At 204, the process selects one from a plurality of different erasure coding algorithms ($ECA_1$, $ECA_2$, $ECA_3$ ... ) for generating encoded data for the DO. At 206, the selected algorithm generates the encoded data $EC_{DO}$. At 208, the process allocates the encoded data $EC_{DO}$ into a number of chunk groups (as required by the selected EC algorithm) and selects a corresponding number of disk storage devices from those in the pool of devices. At 210, the resulting chunk groups are written to the selected disk storage devices, one chunk group per device. If, at step 212, there is a further incoming DO, the process returns to step 202. Otherwise, the process ends.

In accordance with various embodiments of the present invention, the Erasure Code (EC) algorithm selected to encode data can be different with different incoming data objects. For example, the storage system may decide, during a busy part of the day when there is a high utilization of the system, e.g., running at 85% of capacity, to select a simpler erasure code algorithm to reduce the CPU time required to encode the data. The tradeoff would be less tolerance to drive failure. However, later in the day, e.g., at night, when the CPU is not busy, the storage system could retrieve the original data from the encoded data stored in the pool, recalculate the original data using a different more complicated erasure code and then store this encoded data to increase the level of data protection.

In another scenario, a decision on which erasure code to use may depend upon the type of data being received. For example, larger data objects may accommodate many different erasure coding algorithms, all resulting in an efficient utilization of storage space and an acceptable number of compute cycles. Alternatively, smaller objects may be suitable for only a smaller number or different types of erasure coding algorithms. Thus, based on the incoming data, the storage system can dynamically determine which erasure code algorithm to use for coding each respective incoming data.

By way of example, FIGS. 3A-3F illustrate the use of different erasure coding algorithms to generate encoded data, which encoded data can then be stored on a common pool of disk storage devices.

Figure 3B:
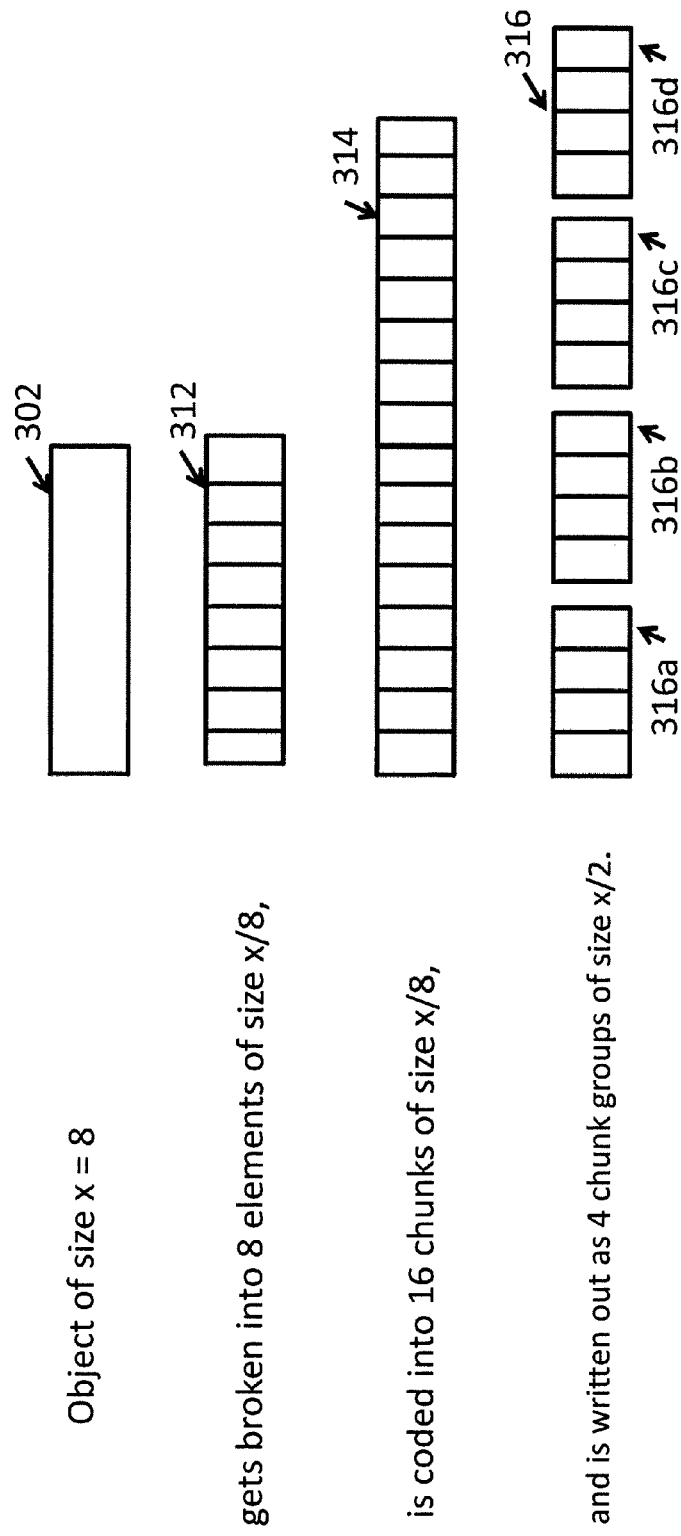
Figure 3C:
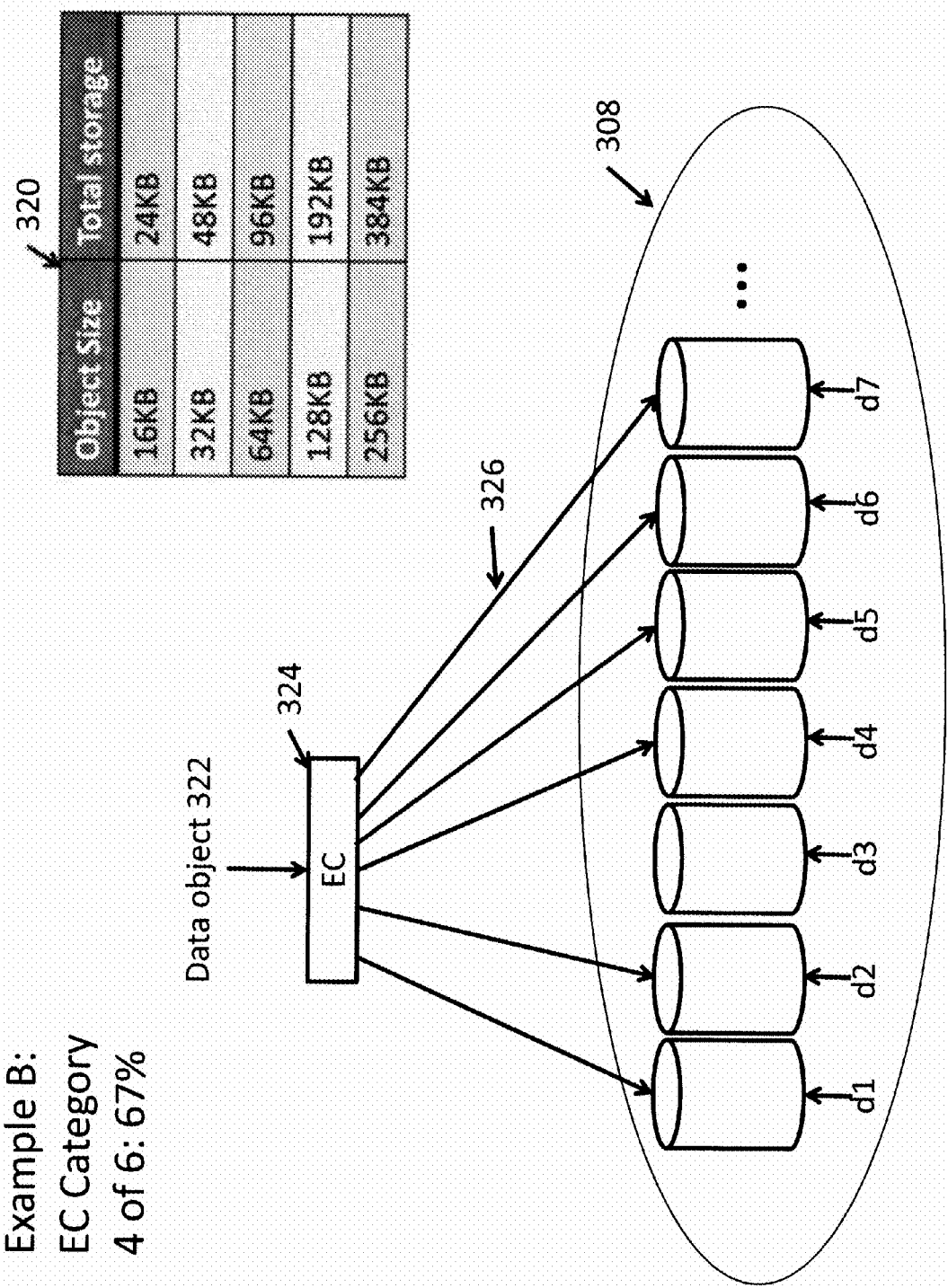
FIGS. 3C-3D illustrate another example of encoding a data object with a 4 of 6 coding algorithm.
Figure 3D:
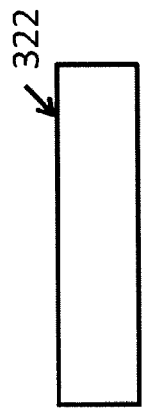
Figure 3D:
Figure 3D:
Figure 3D:
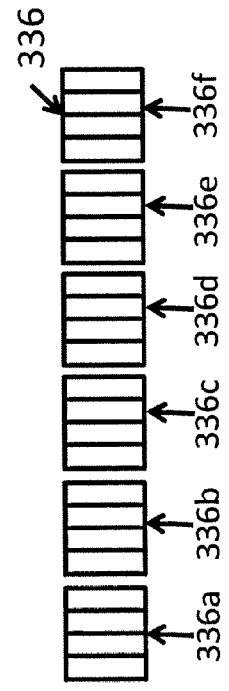
Figure 3E:
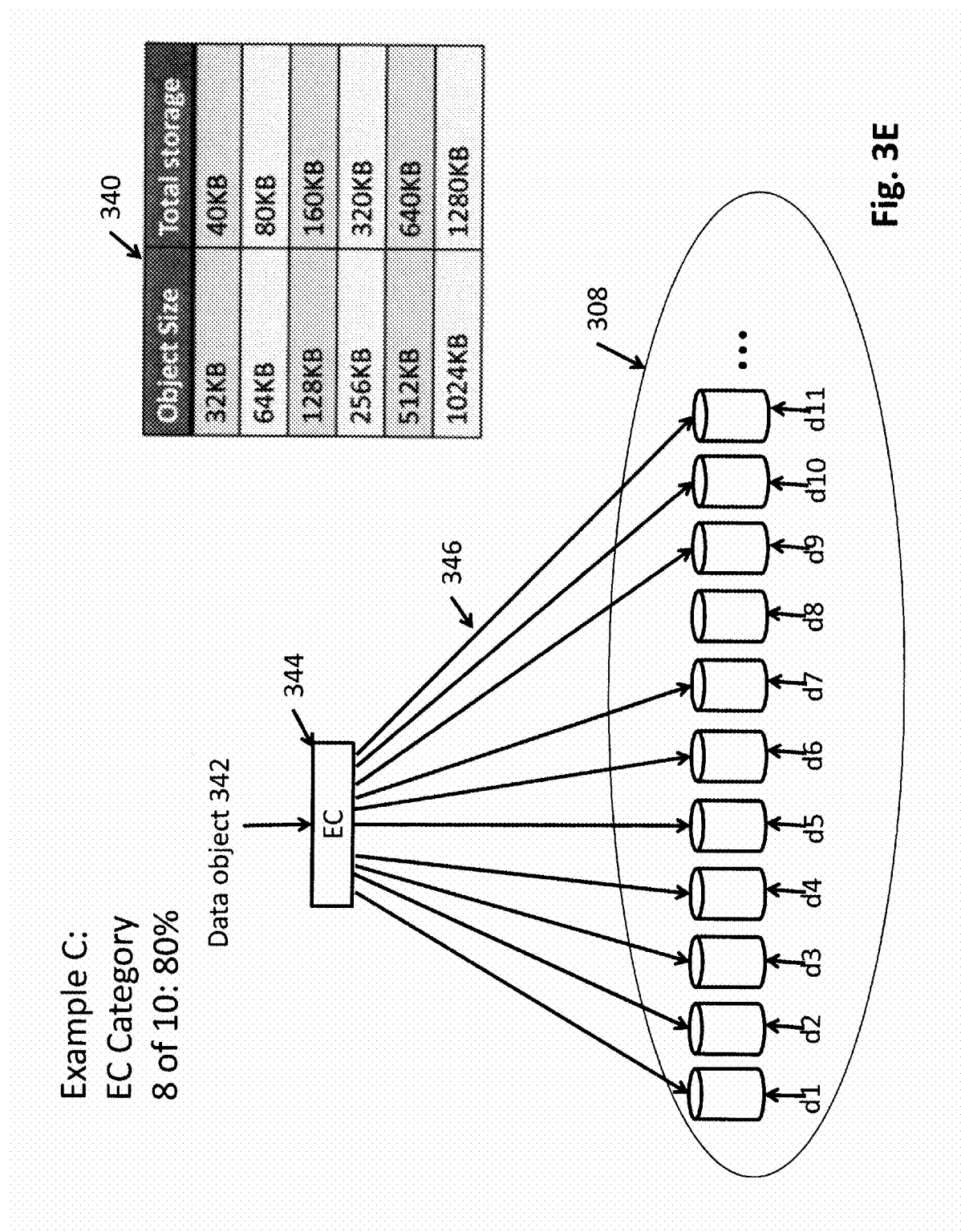
FIGS. 3E-3F illustrate a further example of encoding a data object with a 8 of 10 encoding algorithm.
Figure 3F:
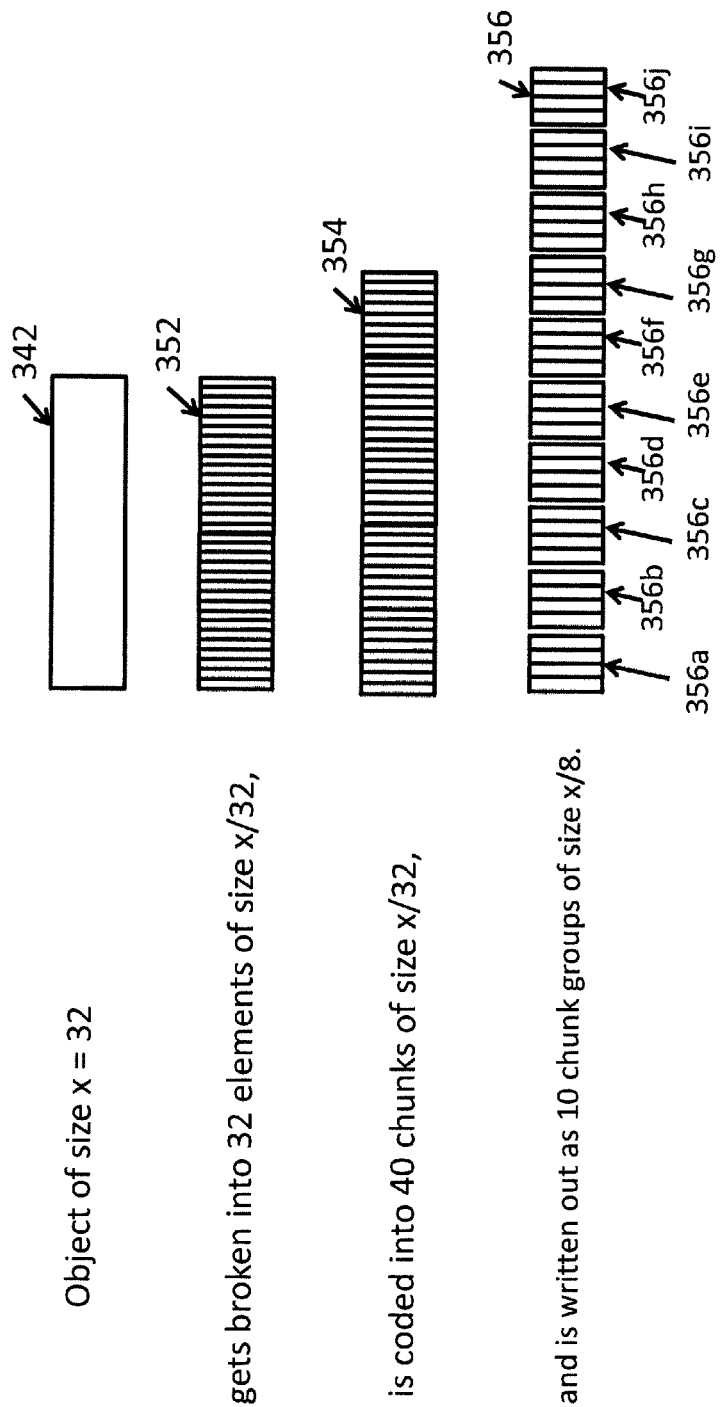

In this series of examples, an erasure code category is labeled "a of b", where "b" is the number of disk storage devices (e.g., drives) on which the encoded data chunk groups are to be stored, one chunk group per device, and "a" is the number of devices that must survive in order to regenerate the original data. FIGS. 3A-3B illustrate Example A in which an EC category 2 of 4 algorithm is used to encode a data object of size 8 KB. FIGS. 3C-3D illustrate Example B in which an EC category 4 of 6 algorithm is used to encode a data object of size 16 KB. FIGS. 3E-3F illustrate Example C in which an EC category 8 of 10 algorithm is used to encode a data object of size 32 KB. The algorithm(s) can be used to encode data objects of other sizes, for example those shown in the tables of FIGS. 3C and 3E.

In Example A of FIGS. 3A-3B, a data object 302 is encoded by a 2 of 4 erasure algorithm at 304 and the encoded data is allocated as 4 chunk groups 306, one to each of 4 disk drives d1, d2, d4 and d6 in the disk storage pool 308. FIG. 3B illustrates the encoding process in which the original data object 302 of size X=8 KB is broken into 8 elements of size X/8, collectively shown as object 312. Next, the 8 elements are combined with error correction algorithms (according to the EC algorithm) resulting in 16 chunks each of size X/8, collectively shown as object 314. The 16 chunks are separated into 4 chunk groups each of size X/2, the 4 chunk groups being labeled 316a, 316b, 316c, and 316d. A different one of the chunk groups is sent to each of the selected disk drives d1, d2, d4 and d6 in the pool 308 as shown in FIG. 3A. The total storage utilized for the encoded data is 16 KB (table 300). This represents a 50% efficiency (storing an object of size 8 KB on a total storage of 16 KB).

By comparison, Example B utilizes a 4 of 6 category algorithm to encode a larger object of size 16 KB, on a total storage of 24 KB, for a 67% efficiency. Alternatively, larger object sizes, e.g., 32 KB, 64 KB, 128 KB, and 256 KB can be encoded with this 4 of 6 algorithm and produce similar efficiency as shown in the table 320 of FIG. 3C. In this particular example, data object 322 is encoded by a 4 of 6 algorithm at 324, and the 6 resulting chunk groups 326 are stored on any six disk drives, here d1, d2, d4, d5, d6 and d7, in the same pool 308 as used with the 2 of 4 category encoded data of FIG. 3A. FIG. 3D illustrates how the data object 322 of size X=16 KB is broken into 16 elements of size X/16, collectively shown as object 332. Next, the 16 elements of 332 are coded into 24 equal size chunks (including error correction elements) of size X/16, collectively shown as object 324. Next, the 24 chunks are divided into 6 equal size chunk groups of size X/4, here designated 336a-f and stored on six drives d1, d2, d4, d5, d6, and d7. Thus, the 4 of 6 encoding for an object size 16 KB was stored in a total storage of 24 KB, a 67% efficiency. Also, in accordance with the present invention, the encoded data from this 4 of 6 EC category algorithms (different than the algorithm category of FIG. 3A) can be stored on all or some of the same drives in the disk storage pool 308 as the encoded data from the 2 of 4 category algorithm (of FIG. 3A).

FIG. 3E illustrates Example C wherein an 8 of 10 EC category algorithm is used to encode a 32 KB object size on 40 KB total storage, an 80% efficiency. A data object 342 is encoded by an 8 of 10 EC algorithm at 344 and separated into 10 equal size chunk groups 346 which are sent to any of 10 disk drives in the pool 308, here d1, d2, d3, d4, d5, d6, d7, d9, d10 and d11. As shown in FIG. 3F, the data object 342 of size X=32 KB is broken into 32 elements of size X/32, collectively shown as object 352. The elements are then coded into 40 equal chunks of size X/32, including error correction codes, and shown collectively as object 354. The object 354 if then divided into 10 equal size chunk groups each of size X/8, shown as chunk groups 356a-j. Again, these chunk groups are stored on some or all of the same disk drives in the pool 308 shown in FIGS. 3A, 3C and 3E. This same 8 of 10 EC algorithm can be used to encode other data sizes as shown in table 340.

B. Bitmask Allocation and Allocation of Aligned Boundaries

More specific implementations of the invention will now be described in which the encoded data is allocated to a plurality of one or more disk storage devices using a bitmask for allocation along one or more aligned boundaries to expedite the allocation and recovery process.

In one example, based on the number of data objects to be stored in an index (number of index entries) and based on the size of the medium for storing the index, a smallest object size is selected to be 4 KB (i.e., the minimum size of data an index entry can represent). Each index entry has a pointer that points to a physical location on disk where the object is stored. The pointer cannot represent less than 4 KB of data. Here, an allocation unit (smallest data size request) is chosen to be the same as the smallest object size, namely 4 KB. As a result, one bit on the allocation bitmask, and one bit on each of the corresponding allocation bitmap and boundary bitmap as described below, represents 4 KB.

Figure 4A:
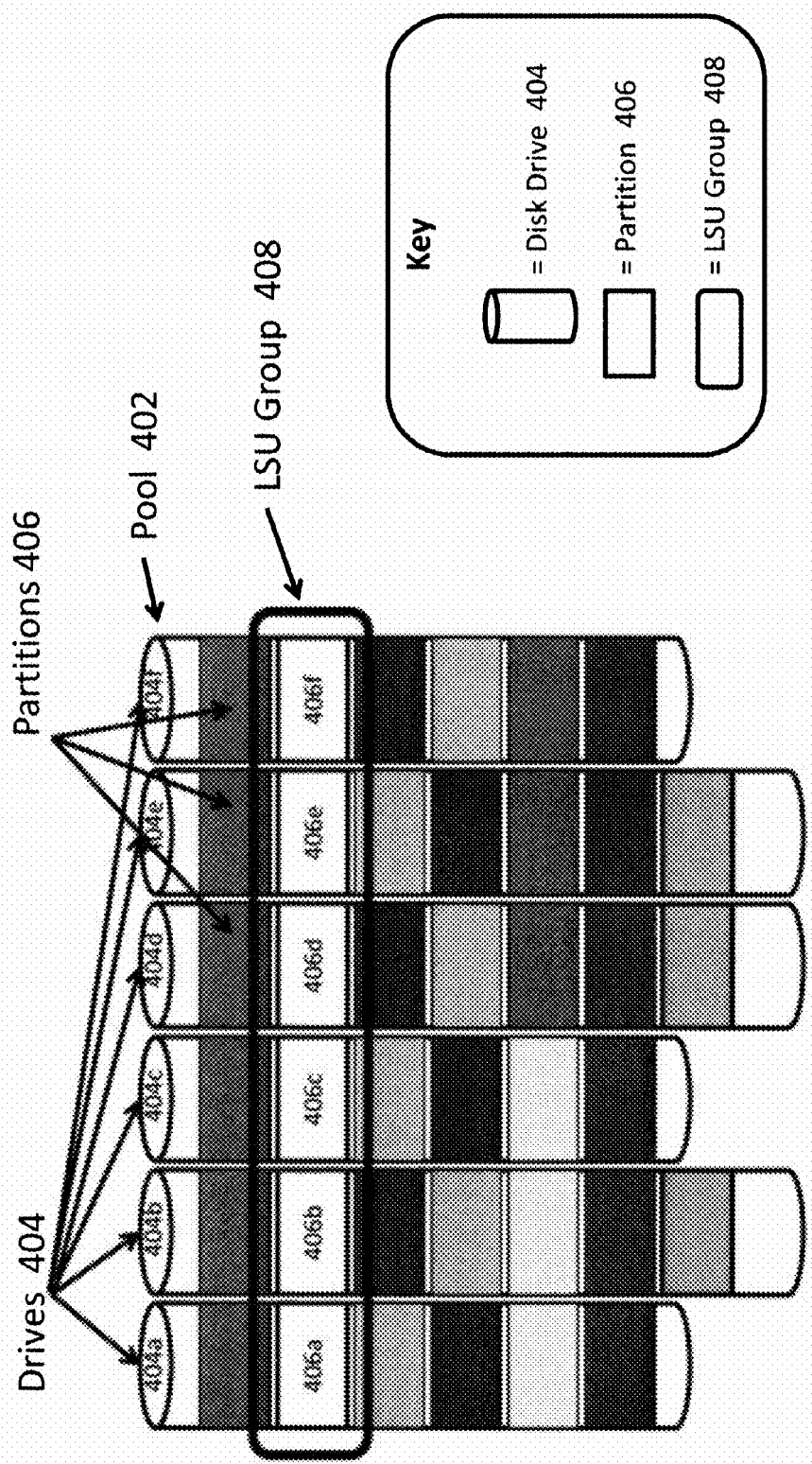
FIGS. 4A-4B illustrate a pool of disk drives, each drive being broken into partitions, and a logical storage unit (LSU) group extending across the drives in the pool.
Figure 4B:
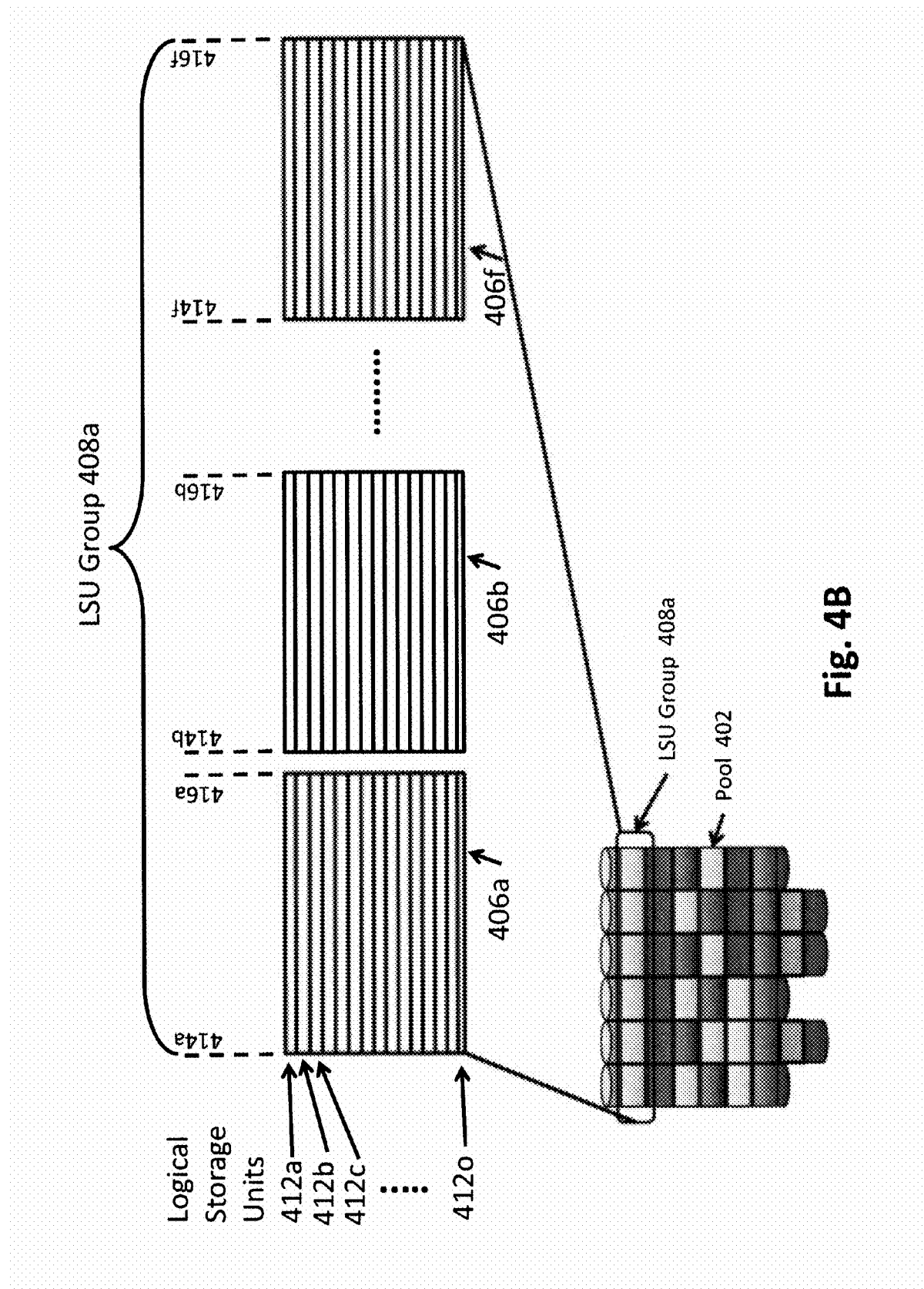

FIGS. 4A-4B illustrate one embodiment of a disk storage pool 402 which includes six disk drives 404a-f. The drives can be of different types and sizes. Each disk drive is partitioned, meaning each disk drive is divided into multiple logical storage units, each defined as a partition 406. The six partitions 406a-f in a group of partitions extending across the drives 404a-f are each of the same size, and belong to one logical storage unit group 408. There cannot be two partitions in one logical storage unit group on the same drive. An allocation bitmap and a boundary bitmap are used for allocating erasure coded data to the drives as described below.

FIG. 4B shows more details of the same drive pool 402 of FIG. 4A, including a schematic representation of one logical storage unit (LSU) group 408a extending across all of the drives 404a-f. The LSU group 408a includes a plurality of layered logical storage units 412a-o, each of which extend across all drives (partitions) in the LSU group 408a. Each partition 406a-f of the LSU group 408a has a plurality of layered partition segments of the logical storage units 412a-o, each of the LSU segments in the partition being aligned along an initial partition boundary 414 and an ending partition boundary 416, labeled 414a-f and 416a-f respectively for each of the disk drives 404a-f. The multiple logical storage units of group 408a in each partition 406 are of equal size and shown stacked one on top of the other.

In general, encoded data can be allocated to a single logical storage unit group as follows. First, the data comes in and is broken up into objects (pieces of data of the same or variable size) and then typically hashed. An object record is created which contains the object name (e.g., hash) and the size of the object. The object is then encoded according to the chosen erasure code and an allocation bitmask is generated to describe to an allocator, see e.g., component 108 in FIG. 1, how that encoded object must be stored. The allocator finds storage space on media (e.g., disk storage) that matches the bitmask. The data is then written out to the media and a pointer is stored in the object record for that object in the index.

Generally, the allocator performs a bit-for-bit comparison between the allocation bitmask and the allocation bitmap. A single allocation bitmap is used by the storage system to record the state (availability) of all storage in the entire system. The bitmap may be stored in a configuration file. A comparison of the allocation bitmask and the allocation bitmap may be described (abstractly) as sliding the bitmask over the bitmap (the direction does not matter) until the pattern in the bitmask matches the bitmap underneath it. When a match is found, this identifies a location to store the data. The location is then stored in the object record in the index as a pointer. In one embodiment, the allocation bitmap maps to a logical address space, and the pointer to the encoded object is a logical object number (LON) that is stored in the object record in the index.

Figure 5:
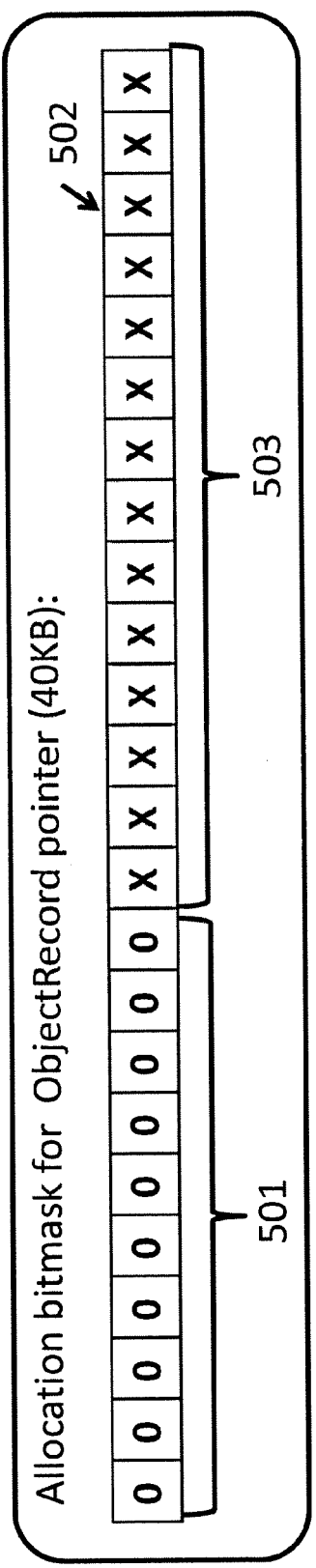
FIG. 5 illustrates one example of an allocation bitmask for allocating encoded data objects according to one embodiment of the invention.
Figure 5:
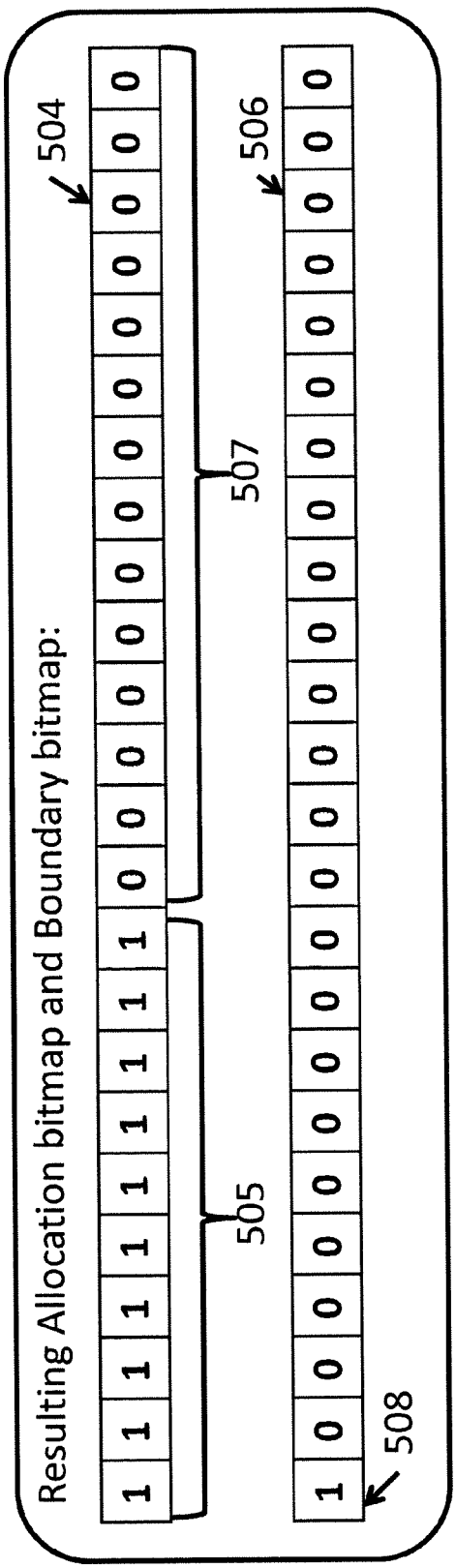

FIG. 5 illustrates one example of allocating encoded data on a single logical storage unit according to the invention. In this example, an allocation bitmask 502 is provided for an object for locating 40 KB of available storage on 24 drives of a drive pool, e.g., a pool of the type shown in FIGS. 1, 3 and 4. A data object of size 32 KB is encoded by an 8 of 10 erasure coding algorithm, resulting in 10 equal size chunk groups, each of size 4 KB. Here, an allocation bitmask 502 is shown having 24 allocation segments (bits), one bit for each of the 24 drives in the logical storage unit group. The first 10 bits (501) are set to "0", meaning they are needed (requested) for allocating the encoded data on any 10 contiguous drives in the logical storage unit group (for storing the 10 encoded chunk groups, one chunk group per drive), where contiguous can mean wrapping back around to the first drive of the next logical storage unit (LSU). For example, if the first available block was on drive 20 at LSU 11, an object with 10 chunk groups would be stored by placing the first 5 chunk groups on drives 20-25 at LSU 11, and the remaining 5 chunk groups would wrap around to drive 1, LSU 12 and continue until completely stored on drives 1-5, at LSU 12. In contrast, in the example of FIG. 5, the first block available aligns with the first drive in the LSU group. The remaining 14 bits (503) are labeled X, meaning they are not needed (don't care whether they are free or not). Typically, the bitmask would be shortened (e.g., for reasons of consuming less memory and less processing) to the shortest length of the requested "0" bits, 10 in this example. The resulting allocation bitmap 504 is shown aligned below the bitmask 502. The first 10 bits (505) of the allocation bitmap are labeled "1", thus allocating the 10 encoded chunk groups, one each to the first 10 drives in the pool, while the remaining 14 bits (507), which will not be used for storing the encoded data, are labeled "0". These bits could be either 0 or 1, depending on whether they were previously allocated. In this case they have not been previously allocated. A boundary bitmap 506, shown aligned below the allocation bitmap 504, similarly has 24 segments (bits), the first bit (508) being labeled "1" to designate which partition number (which drive) the first chunk of the encoded data object is stored on, here the first drive in the LSU group.

In accordance with this coding scheme, whole or partial logical storage units can be allocated and written to at once. Also, a partial logical storage unit read is possible, e.g., reading only the object requested.

For example, a starting block (allocation unit) for an object along with the length of the object can be stored in an index record. This would provide all of the information needed to locate (read) one object and only that object. However, in some cases the object size is beyond the capacity of the allocation bitmask. One solution to this problem is illustrated by the encoding example of FIGS. 6A-6C, where it is desired to encode a large object (80 KB) within the requirements of the 8 of 10 erasure code (10 drives), such that each drive must hold 8 KB of data. It was previously determined (in this example) that each bit of the allocation bitmask can only represent 4 KB of data. This leads to a choice.

One option is to limit the object size to a number equal to the product of: (granularity of allocation) (number of chunk groups as required by EC algorithm). This would force a large object, such as in the present example (80 KB), to be encoded as two separate objects, each of which could land on different logical storage unit groups or with a gap between logical storage units on the same logical storage unit group. This option is still more flexible than the prior art allocation method which only allows contiguous allocation, whereas the allocation bitmask of the present invention allows for gaps and permits non-contiguous allocation.

Figure 6A:
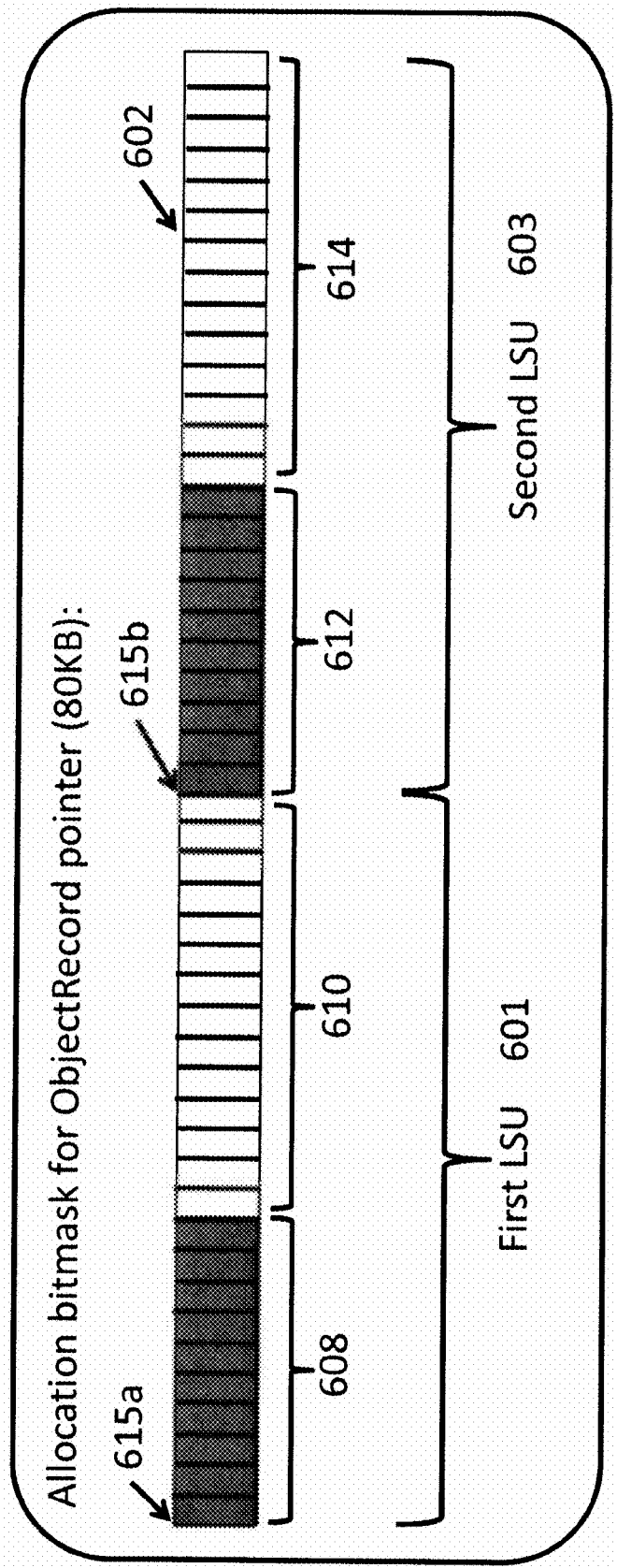
FIGS. 6A-6C illustrate another embodiment of an allocation bitmask for allocating encoded data objects according to another embodiment of the invention.
Figure 6B:
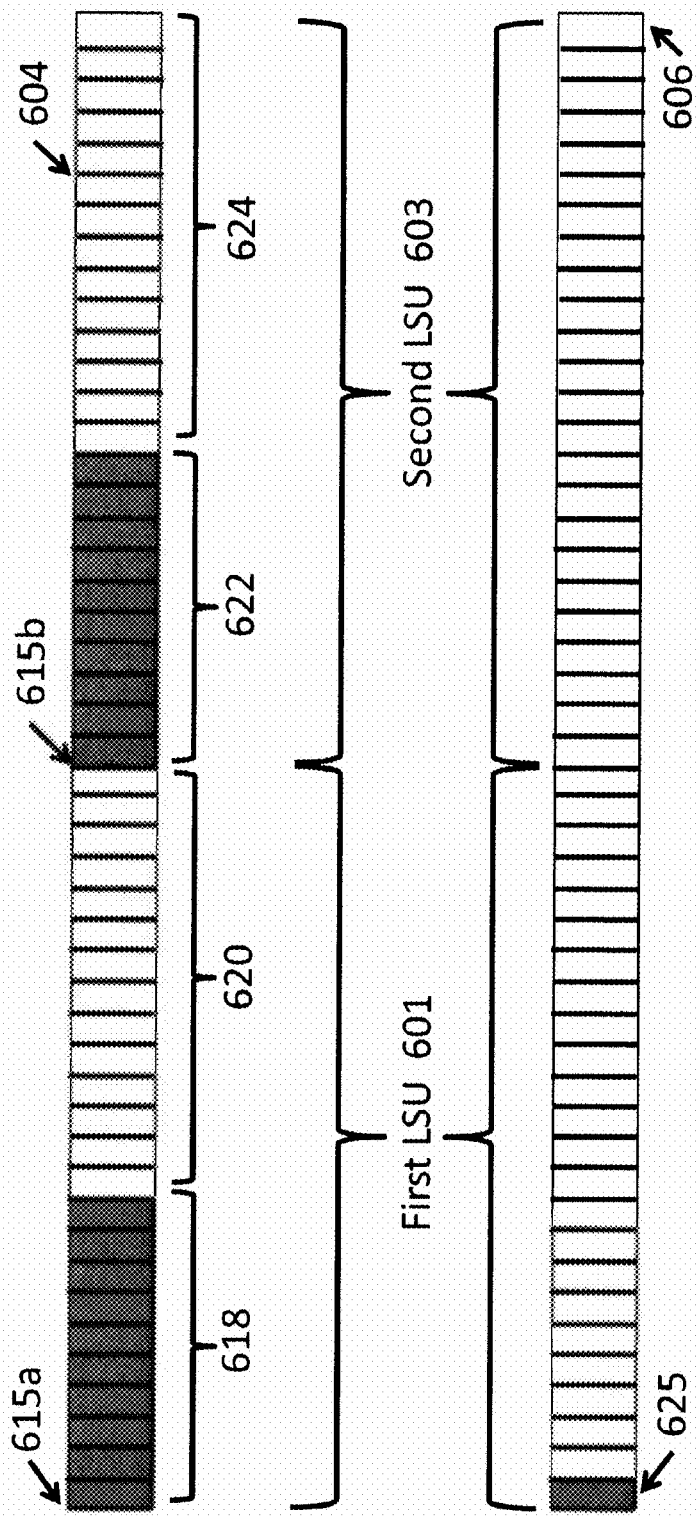
Figure 6C:
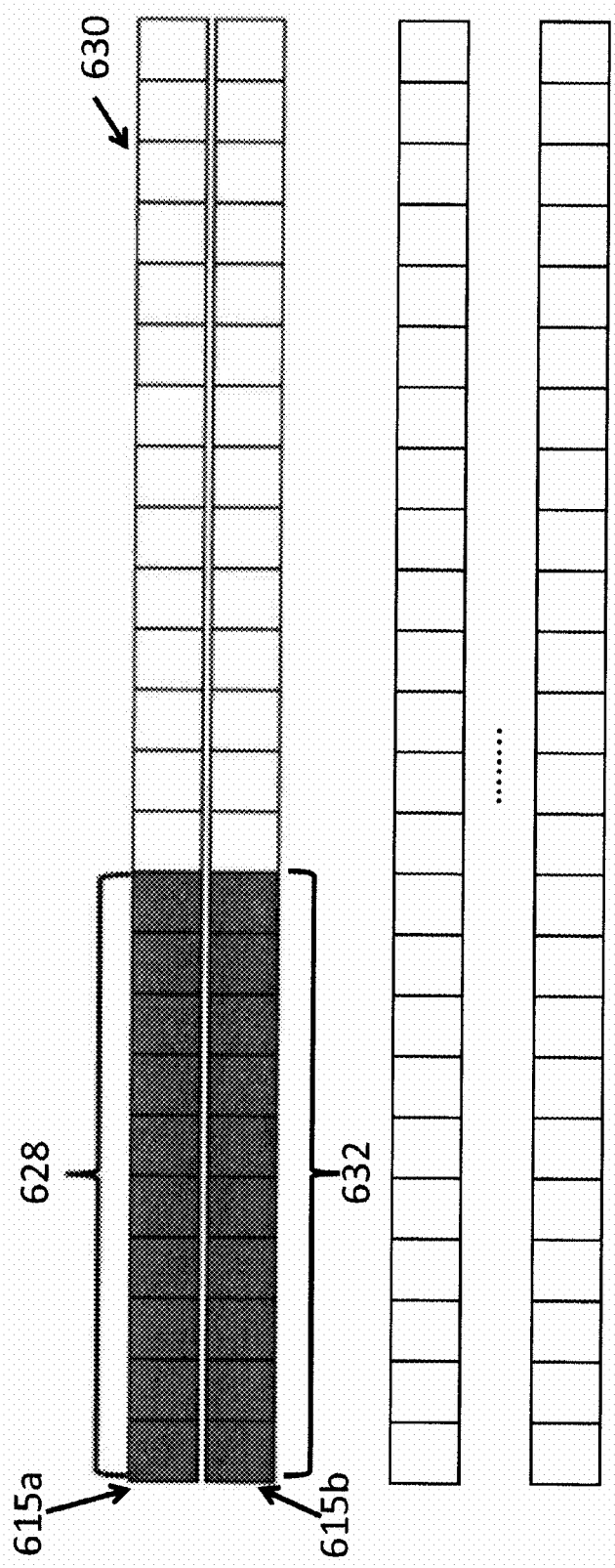

A second option, according to a preferred embodiment of the invention, allows one request to have multiple allocation bits per chunk group. This choice is illustrated in FIGS. 6A-6C. In FIG. 6A, each chunk group is allocated two bits in the allocation bitmask, and the initial bits of each chunk group are aligned along the common boundary of two logical storage units 615a, 615b in the same logical storage unit group. More generally, the common boundary can be any partition boundary, i.e., the data chunks need not be stored on the first drive in the logical storage unit group, but rather can be stored starting at any drive in the pool. In FIG. 6A, the allocation bitmask 602, for one object locating 80 KB of data, has an initial 24 bits representing a first logical storage unit 601 (across 24 drives) and a second 24 bits representing a second logical storage unit 603 (across the 24 drives). The first 10 bits (608) of the first 24 bits representing the first logical storage unit, are shaded to mark them as being requested (must be free), while the next 14 bits (610) are unshaded (need not be free). Also, the first 10 bits (612) of the second 24 bits representing the second logical storage unit, are also shaded (requested to be free), while the next 14 bits (614) are not required (and not relevant in this example, where only two logical storage units are requested). The unshaded bits 610 are important—they constitute a "gap" which enables all 80 KB of data to be allocated with one request across two logical storage units on 10 drives.

Here, a single bitmask 602 is used to store a single object to 80 KB of total storage, the stored data being allocated in two equal 40 KB portions 608, 612 that are aligned on the logical storage unit boundary 615. A 14 segment non-allocated "gap" 610 is provided in the allocation bitmask between the allocated segments 1-10 (608) of the first logical storage unit, and the allocated segments 1-10 (612) of the second logical storage unit, enabling a single bitmask to be used to allocate the encoded data to multiple logical storage units aligned on a common logical storage unit boundary 615. As previously sated, the common boundary can be any partition boundary, it need not be the logical storage unit boundary.

FIG. 6B illustrates the resulting allocation bitmap 604 and boundary bitmap 606. The allocation bitmap 604 similarly has 48 segments, the first 24 segments designating the first logical storage unit 601 and the second 24 segments designating the second logical storage unit 603. The first 10 segments 608, 612 in each of the first and second logical storage units 601, 603 respectively are allocated for the 10 chunk groups of the encoded object data (2 bits for each chunk group). The boundary bitmap 606 has 48 segments, the first segment 625 marking the disk block (first block of first logical storage unit) that contains the first chunk of the encoded object.

FIG. 6C illustrates how the two equal size 40 KB portions of encoded data 628, 632 are aligned on the same partition (e.g., logical storage unit) boundary 615, in stacking alignment. FIG. 6C is a view of the encoded data stored on disk storage 630, where each column is a drive and each row is a logical storage unit. By stacking the encoded data on a common boundary 615, this enables the disk head to access two logical storage units of encoded data with a single drivehead seek, i.e., a single head can access a larger volume of stored data on multiple logical storage units, without violating the requirements of the erasure coding. This improves the I/O performance. In this example, if two drives fail, the encoded data can be regenerated with 8 head seeks. In contrast, the prior art may require 16 head seeks to regenerate the data.

The above example illustrates how to allocate a single object across multiple logical storage units using a single pointer in the index, without breaking the erasure code requirements. The allocation bitmap allows non-allocated gaps that line up with the partition boundaries. It also allows larger objects to be encoded in a single request. By placing a single object across contiguous partitions and contiguous logical storage units in a logical storage unit group, encoded data can be stacked (tiled) on one or more disk drives. In the example of FIG. 6, a single bitmask (request) was used to map a 4 KB block from each drive, consecutively and wrapping back around to the first drive once the last drive is mapped.

Still further, in accordance with one embodiment of the present invention, more than one data object can be placed on a logical storage unit, e.g., the remaining 14 drives on the allocation bitmask 502 illustrated in FIG. 5, or the remaining 14 drives on the allocation bitmask of FIG. 6, can store other data objects. Also, the encoded data on a logical storage unit can be encoded by multiple different encoding algorithms. The only requirement is that the number of drives required by an encoding algorithm be less than or equal to the partitions in a logical storage unit group, for the object to be stored on this logical storage unit group.

The allocation bitmap in the above examples marks which logical object numbers (LONs) are available for storing the encoded data. The boundary bitmap marks the block that contains the first chunk of an encoded object. The boundary bitmap is used for reverse mapping from the physical block number (PBN) to the object record. For example, if a disk drive fails, in order to regenerate the data that was on the drive when it failed one must know which object chunk-group resided on the failed drive in order to recalculate the missing data from the coded data. There are two ways to do this:

1) Scan the index for all objects that have an address (LON through LON+length) that belongs on the failed drive; when an object is found that meets the criteria, read the remaining object chunk-groups, recalculate the missing data, and rewrite the missing chunk-group; or 2) Scan the allocation and boundary bitmaps for object boundaries that span the failed drive; when found, read the remaining object chunk-groups, recalculate the missing data, and rewrite the missing chunk group.

Method 1 requires both disk and index operations. Method 2 only requires disk operations.

C. Computing and Storage Environment

The previously described EC algorithm selection and data storage allocation methods may be implemented in a suitable computing and storage environment, e.g., in the context of computer-executable instructions that may run on one or more computers. In for example a distributed computing environment certain tasks are performed by remote processing devices that are linked through a communications network and program modules may be located in both local and remote memory storage devices. The communications network may include a global area network, e.g., the Internet, a local area network, a wide area network or other computer network. It will be appreciated that the network connections described herein are exemplary and other means of establishing communications between the computers may be used.

A computer may include a processing unit, a system memory, and system bus, wherein the system bus couples the system components including, but not limited to, the system memory and the processing unit. A computer may further include disk drives and interfaces to external components. A variety of computer-readable media can be accessed by the computer and includes both volatile and nonvolatile media, removable and nonremovable media. A computer may include various user interface devices including a display screen, touch screen, keyboard or mouse.

Figure 7:
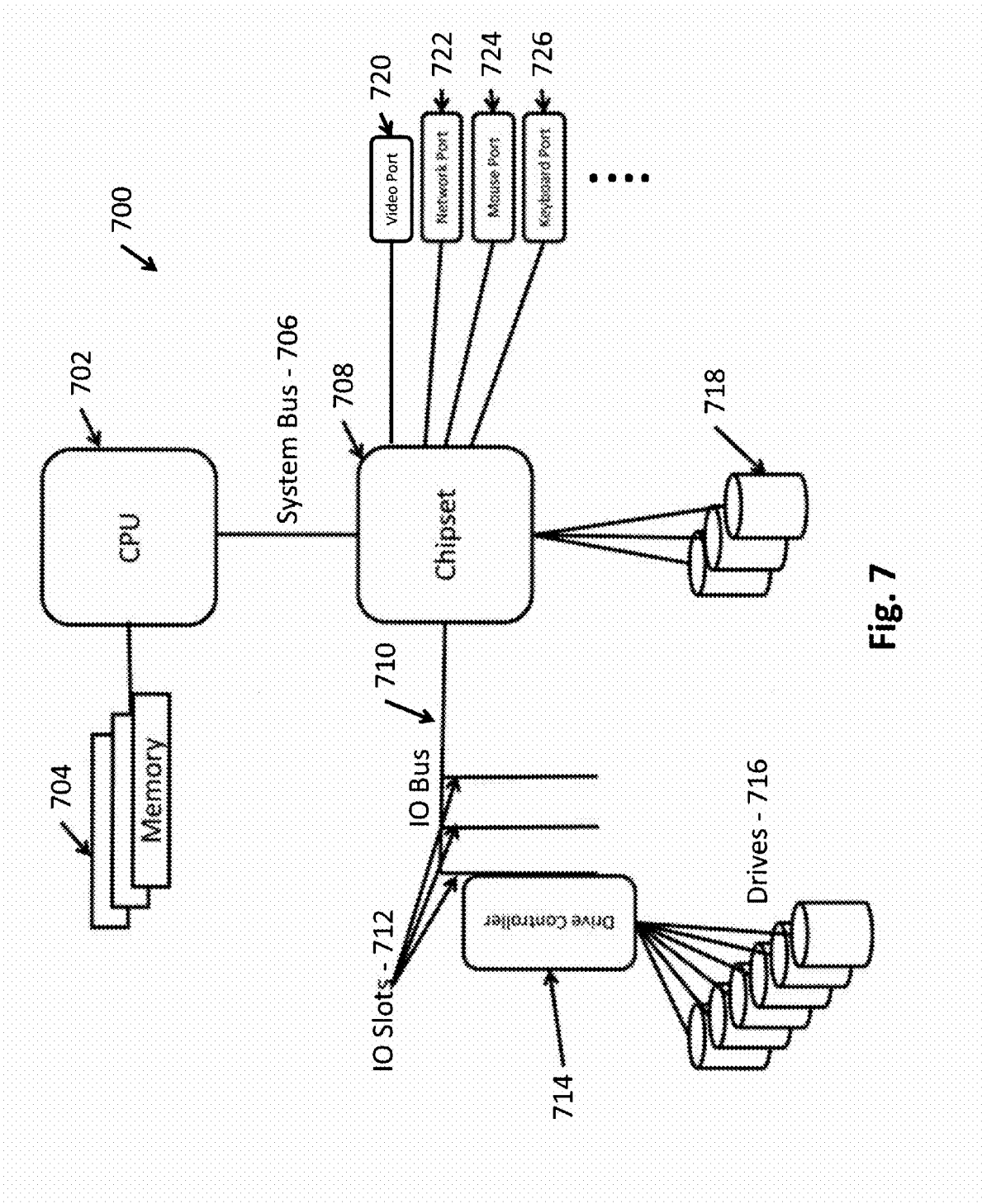
FIG. 7 illustrates one embodiment of a general system configuration for processing and storing data.

Referring now to FIG. 7, there is illustrated one example of a general system configuration 700 for communications between a computer and a plurality of disk storage devices. The disk storage can be any of various storage devices in which data are digitally recorded by various electronic, magnetic, optical or mechanical methods on a surface of one or more rotating disks, including hard disk drives, floppy disk drives and optical disk drives. A CPU 702 is shown attached to system memory 704, and a system bus 706 connects the CPU to chipset 708. The chipset is connected via an IO bus 710 and multiple IO slots 712, to any of various input/output devices, such as a drive controller for connecting a plurality of disk drives 716. The chipset may also be connected to other storage devices 718. The chipset may include one or more of a video port 720, a network port 722, a mouse port 724, a keyboard port 726, etc.

What has been described above includes examples of the present invention. It is, of course, not possible to describe every conceivable combination of components or methodologies for purposes of describing the present invention, but one of the ordinary skill in the art will recognize that further combinations and permutations of the present invention are possible. Accordingly, the present invention is intended to embrace all such alternations, modifications and variations that fall within the present disclosure and/or claims.

The invention claimed is:

1. A computer-implemented method comprising:
    allocating encoded data objects for storage in a pool of disk storage devices comprising multiple disk drives;
    at least some of the encoded objects being generated by different error correction algorithms and allocation is not restricted to a group of drives based on the algorithm utilized to generate the encoded object;
    each disk drive is divided into multiple logical storage units, each defined as a partition;
    a logical storage unit group (LSU group) comprising a group of partitions extending across a group of disk drives, wherein the partitions of the LSU group are each of the same size and cannot be on the same drive;
    the allocating of each encoded data object being performed utilizing a single allocation bitmap that extends across the LSU group to identify available locations for storage of the object, wherein the object is allocated to one available location defined by contiguous bits of the bitmap, or to multiple locations aligned along a common partition boundary allowing a gap of non-contiguous allocation between the two locations.

2. The method of claim 1, wherein:
    the allocating step includes allocating the encoded objects on different drives.

3. The method of claim 2, wherein:
    the allocating step includes allocating encoded objects encoded by different error correction algorithms.

4. The method of claim 1, wherein:
    the method includes encoding data by different error correction algorithms to generate the encoded objects and maintaining an index which maps the encoded object to its respective error correction algorithm.

5. The method of claim 1, wherein:
    the allocating step includes allocating multiple encoded objects on the same logical storage unit.

6. The method of claim 1, wherein:
    the allocating step includes allocating multiple encoded objects on the same logical storage unit group.

7. The method of claim 1, including:
    using the allocation bitmap to request allocation units aligned with a common partition boundary.

8. The method of claim 1, wherein:
    the object size of the data being encoded is fixed.

9. The method of claim 1, wherein:
    the object size of the data being encoded is variable.

10. The method of claim 1, wherein:
    the data objects are encoded by different categories of error correction algorithms.

11. The method of claim 1, including:
    providing an index of the encoded data objects which maps each encoded data object to its respective error correction algorithm.

12. The method of claim 1, wherein:
    the allocating step includes using an allocation bitmap assigning multiple allocation bits per chunk group of the respective error correction algorithm.

13. The method of claim 12, wherein:
    the allocation bitmap maps to a logical address space.

14. The method of claim 13, wherein:
    a logical object number (LON) defines a pointer to the encoded object.

15. The method of claim 12, wherein the allocating step uses a boundary bitmap marking the allocation unit for an initial chunk of the encoded object.

16. The method of claim 1, wherein:
    a pointer to the encoded object is stored in an index record.

17. The method of claim 16, wherein:
    the index record includes multiple pointers to the encoded object.

18. A non-transitory computer-readable medium having stored thereon instructions which perform, when loaded into a computer, the method steps according to claim 1.

19. A programmable logic configured to implement the method steps according to claim 1.

20. A data storage system comprising:
an error correction algorithm component operable to select, for different incoming data objects, different error correction algorithms for generating encoded data objects; and
a disk storage allocation component for allocating the encoded data objects for storage in a pool of disk storage devices comprising multiple disk drives, at least some of the encoded objects generated by different error correction algorithms being allocated to the same or a different group of drives that is not based on the algorithm utilized to generate the encoded object;
wherein each disk drive is divided into multiple logical storage units, each defined as a partition;
a logical storage unit group (LSU group) comprising a group of partitions extending across a group of disk drives wherein the partitions of the LSU group are of each of the same size and cannot be on the same drive;
the allocation component utilizing a single allocation bitmap that extends across the LSU group to identify available locations for storage of the object, wherein the object is allocated to one available location defined by contiguous bits of the bitmap, or to multiple locations aligned along a common partition boundary allowing a gap of non-contiguous allocation between the two locations.

21. The storage system of claim 20, further comprising:
the pool of disk storage devices for storing the encoded data objects.

22. The storage system of claim 20, wherein:
the allocation bitmap assigns multiple bits per chunk group of the respective error correction algorithm.

23. The storage system of claim 20, including:
an index of the encoded data objects which maps each encoded data object to its respective error correction algorithm.

24. In a computing environment for locating data storage, a data structure comprising an allocation bitmap, stored on a non-transitory computer-readable medium, to request available allocation units for storing encoded data objects in a pool of disk storage devices comprising multiple disk drives;
at least some of the encoded objects being generated by different error correction algorithms and allocation is not restricted to a group of drives based on the algorithm utilized to generate the encoded object;
each disk drive is divided into multiple logical storage units, each defined as a partition;
a logical storage unit group (LSU group) comprising a group of partitions extending across a group of disk drives, wherein partitions of the LSU group are each of the same size and cannot be on the same drive;
the single allocation bitmap extends across the LSU group to identify available locations for storage of the object, the bitmap including multiple available locations aligned along a common boundary allowing a gap of non-contiguous allocation between the two locations.

* * * * *